United States Patent
Wu et al.

(10) Patent No.: US 8,149,595 B1
(45) Date of Patent: Apr. 3, 2012

(54) MOUNTING APPARATUS FOR EXPANSION CARDS

(75) Inventors: Hung-Yi Wu, New Taipei (TW); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/007,969

(22) Filed: Jan. 17, 2011

(30) Foreign Application Priority Data

Dec. 15, 2010 (CN) .......................... 2010 1 0589739

(51) Int. Cl.
*H05K 7/12* (2006.01)
*H05K 7/14* (2006.01)

(52) U.S. Cl. .................... 361/825; 361/679.02; 361/809; 361/679.01; 174/50; 248/674; 439/267; 439/61; 439/62

(58) Field of Classification Search .............. 361/679.32, 361/796, 724, 679.31, 679.02, 825, 600, 361/802, 679.01, 807, 809; 439/61, 59, 62, 439/607, 29, 267; 174/50; 248/674
See application file for complete search history.

(56) References Cited

U.S. PATENT DOCUMENTS

| | | | | |
|---|---|---|---|---|
| 4,745,524 A * | 5/1988 | Patton, III | ............... | 361/679.32 |
| 6,608,755 B2 * | 8/2003 | Baldwin et al. | ............... | 361/729 |
| 6,764,330 B1 * | 7/2004 | Chen | ............................. | 439/325 |
| 7,120,032 B2 * | 10/2006 | Lin et al. | ....................... | 361/801 |
| 7,499,289 B2 * | 3/2009 | Liang | ............................ | 361/796 |
| 7,561,439 B2 * | 7/2009 | Orr et al. | ....................... | 361/796 |
| 7,586,757 B2 * | 9/2009 | Zhang et al. | .................. | 361/802 |
| 7,626,830 B2 * | 12/2009 | Fan et al. | ....................... | 361/801 |
| 2009/0147492 A1 * | 6/2009 | Heinrichs et al. | ............. | 361/784 |

* cited by examiner

*Primary Examiner* — Angel R Estrada
*Assistant Examiner* — Dimary Lopez
(74) *Attorney, Agent, or Firm* — Altis Law Group, Inc.

(57) ABSTRACT

A mounting apparatus includes a bracket, a first circuit board, a securing member, and a second circuit board. The bracket includes a first sidewall, and an end wall perpendicularly extending from a front end of the first sidewall, for fixing a stop plate of a first expansion card. The first circuit board is mounted to the first sidewall of the bracket adjacent to the end wall. A first expansion slot is installed on the first circuit board for engaging with the first expansion card. The securing member is detachably mounted to the first sidewall behind the first circuit board and away from the end wall, for fixing a stop plate of a second expansion card. The second circuit board is detachably mounted to the first sidewall adjacent to the securing member. A second expansion slot is installed on the second circuit board for engaging with the second expansion card.

4 Claims, 4 Drawing Sheets

MOUNTING APPARATUS FOR EXPANSION CARDS

BACKGROUND

1. Technical Field

The present disclosure relates to a mounting apparatus for expansion cards.

2. Description of Related Art

Typically, a number of expansion cards having different lengths are selectively mounted to a mounting apparatus in an electronic device, such as a server. However, when there is a need to replace a long expansion card with a short expansion card, the rear section of the mounting apparatus behind the short expansion card will be vacant, which is a waste of space.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
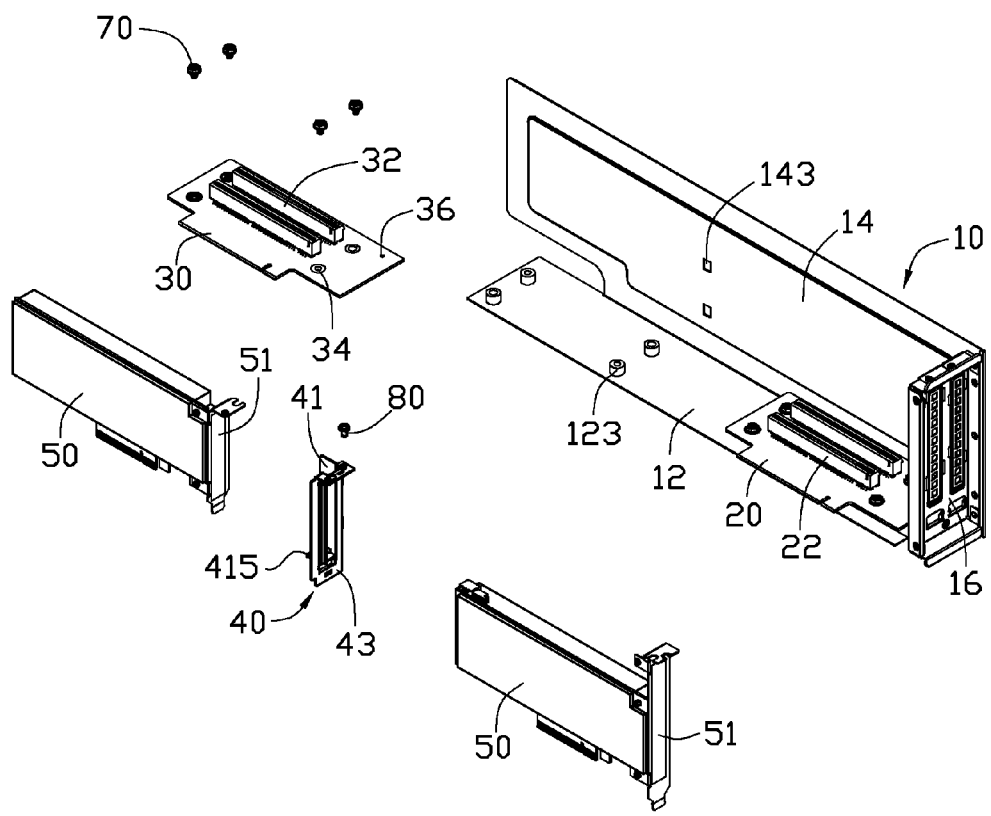
FIG. 1 is an exploded, isometric view of an embodiment of a mounting apparatus together with two short expansion cards.
Figure 2:
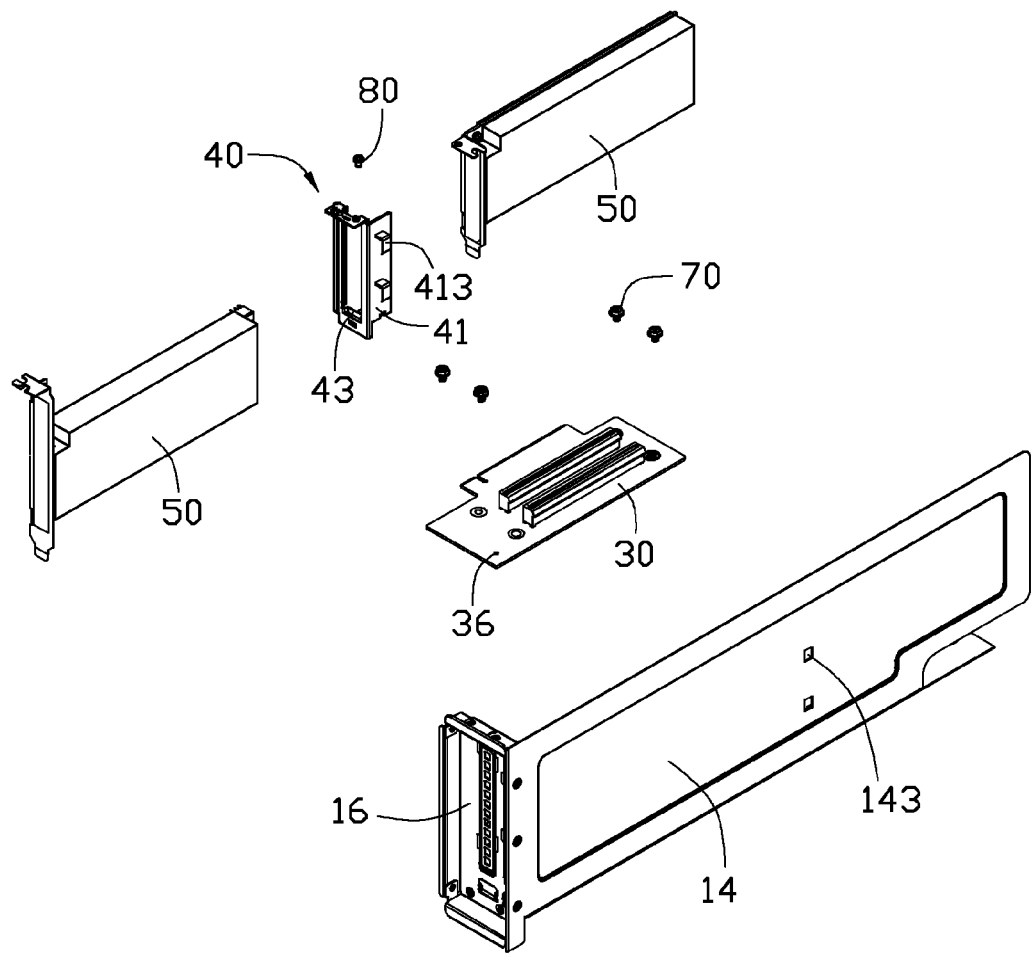
FIG. 2 is similar to FIG. 1, but viewed from another perspective.

Referring to FIGS. 1 and 2, an embodiment of a mounting apparatus includes a bracket 10, a first circuit board 20, a second circuit board 30, and a substantially L-shaped securing member 40.

The bracket 10 includes a first sidewall 12, a second sidewall 14 perpendicularly extending from a side of the first sidewall 12, and an end wall 16 perpendicularly connected to front ends of the first and second sidewalls 12 and 14. The first circuit board 20 is installed on the first sidewall 12 adjacent to the end wall 16. Two expansion slots 22 are mounted to the first circuit board 20 and are perpendicular to the end wall 16. Four fixing portions 123 are formed on the first sidewall 12 away from the end wall 16. Two spaced latching slots 143 are defined in the second sidewall 14 between the first circuit board 20 and the fixing portions 123.

Two expansion slots 32 are mounted to the second circuit board 30. Four fixing holes 34 are defined in the second circuit board 30, corresponding to the fixing portions 123 of the first sidewall 12. A threaded hole 36 is defined in the second circuit board 30 adjacent to a corner of the second circuit board 30.

The securing member 40 includes a supporting plate 41 and a fixing plate 43 perpendicularly connected to the supporting plate 41. Two latches 413 protrude from a side of the supporting plate 41 away from the fixing plate 43. A tab 415 perpendicularly extends from a bottom of the supporting plate 41, facing the fixing plate 43.

Figure 3:
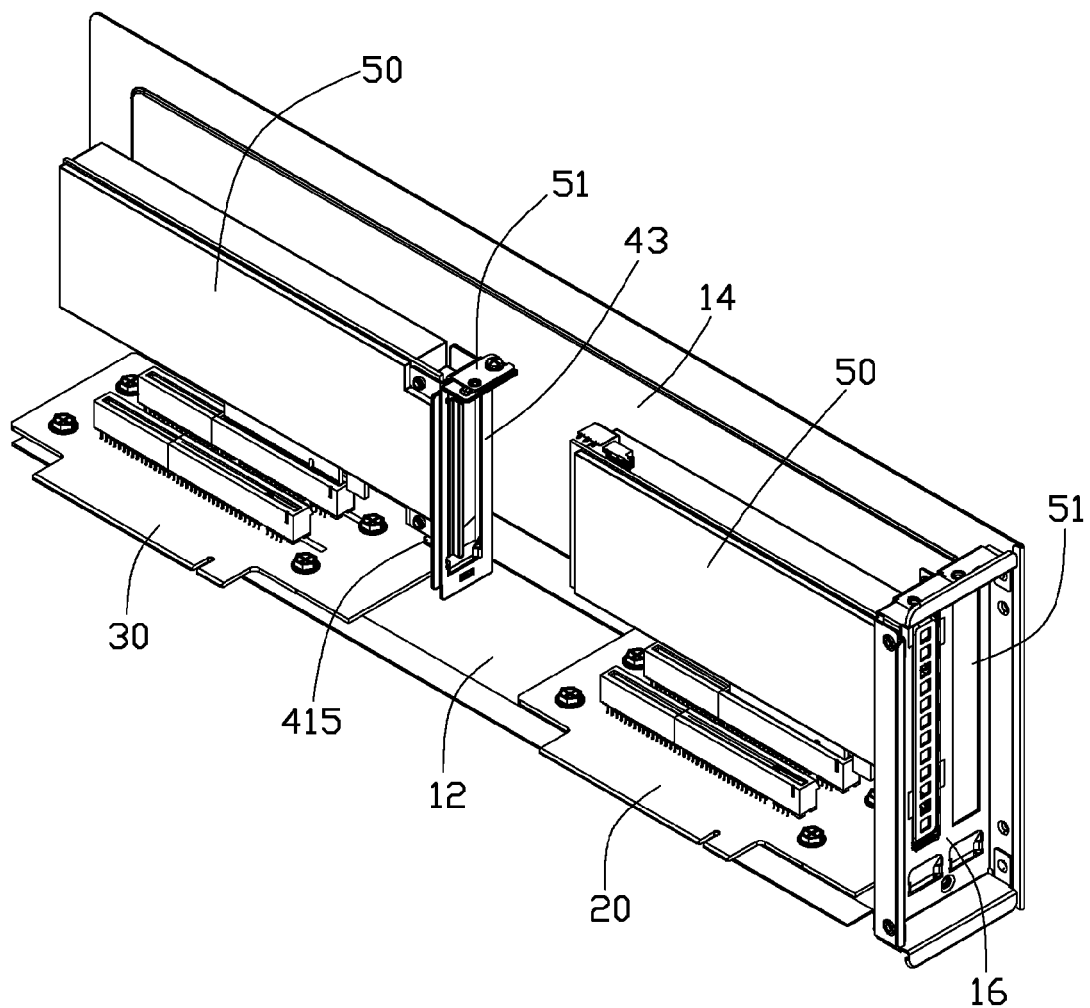
FIG. 3 is an assembled, isometric view of FIG. 1.

Referring to FIG. 3, when a short expansion card 50 is received in the expansion slot 22 of the first circuit board 20 adjacent to the second sidewall 14, with a stop plate 51 of the short expansion card 50 fixed to the end wall 16 of the bracket 10, the space of the bracket 10 behind the short expansion card 50 is vacant. If there is a need to mount another short expansion card 50, four screws 70 are respectively extended through the fixing holes 34 of the second circuit board 30, and engage in the corresponding fixing portions 123 of the first sidewall 12 of the bracket 10, to fix the second circuit board 30 to the bracket 10 behind the first circuit board 20. The expansion slots 32 of the second circuit board 30 are respectively aligned with the expansion slots 22 of the first circuit board 20. Thereby, each expansion slot 32 is arranged in a same line with a corresponding expansion slot 22 in front of the expansion slot 32. The latches 413 of the securing member 40 are engaged in the corresponding latching slots 143 of the second sidewall 14, to allow the supporting plate 41 of the securing member 40 to engage with an inner surface of the second sidewall 14. A screw 80 is extended through the tab 415 of the securing member 40, and engages in the threaded hole 36 of the second circuit board 30, to fix the securing member 40 to the second circuit board 30. The other short expansion card 50 is received in the expansion slot 32 of the second circuit board 30 adjacent to the second sidewall 14, with a stop plate 51 of the other short expansion card 50 fixed to the fixing plate 43 of the securing member 40 with a screw. Therefore, the space of the bracket 10 is fully used. The other expansion slot 22 of the first circuit board 20 away from the second sidewall 14 can receive either a long expansion card 60 (as shown in FIG. 4), or another short expansion card 50.

Figure 4:
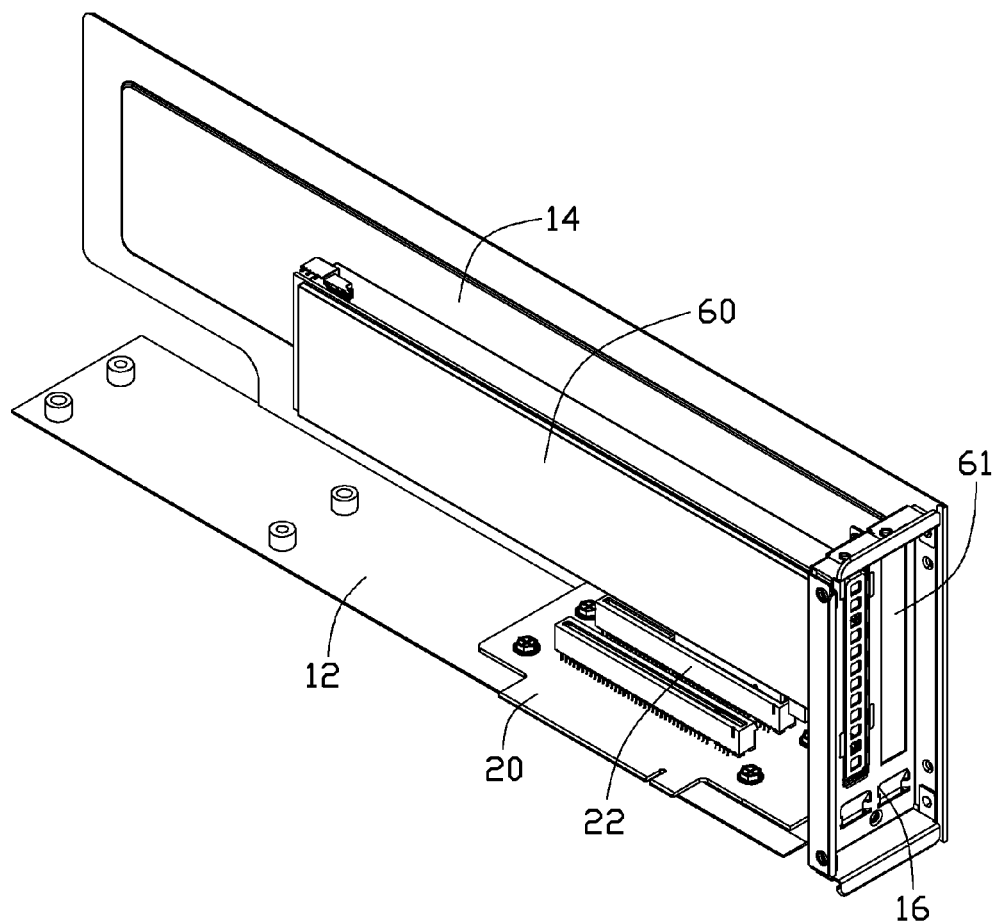
FIG. 4 is an assembled, isometric view of the mounting apparatus of FIG. 1 together with a long expansion card.

Referring to FIG. 4, to mount a long expansion card 60 to the first circuit board 20 so that it is adjacent to the second sidewall 14, the second circuit board 30 and the securing member 40 are detached from the bracket 10. The long expansion card 60 is received in the corresponding expansion slot 22 of the first circuit board 20, with a stop plate 61 of the long expansion card 60 fixed to the end wall 16 of the bracket 10.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A mounting apparatus for expansion cards, the mounting apparatus comprising:

a bracket comprising a first sidewall, and an end wall perpendicularly extending from a front end of the first sidewall, for fixing a stop plate of a first expansion card; and a first circuit board mounted to the first sidewall of the bracket adjacent to the end wall, a first expansion slot installed on the first circuit board for engaging with the first expansion card;

a securing member detachably mounted to the first sidewall behind the first circuit board and away from the end wall, for fixing a stop plate of a second expansion card; and a second circuit board detachably mounted to the first sidewall adjacent to the securing member, a second expansion slot installed on the second circuit board for engaging with the second expansion card, wherein the second expansion slot and the first expansion slot are arranged in a same line perpendicular to the end wall.

2. The mounting apparatus of claim 1, wherein the bracket further comprises a second sidewall perpendicular to the first sidewall and the end wall, two latching slots are defined in the second sidewall away from the end wall, the securing member comprises a supporting plate, and a fixing plate perpendicular to the supporting plate for fixing the stop plate of the second expansion card, two latches protrude from a side of the supporting plate away from the fixing plate, to engage in the corresponding latching slots of the second sidewall.

3. The mounting apparatus of claim 2, wherein a tab perpendicularly extends from a bottom of the supporting plate facing the fixing plate, a screw is extended through the tab of the securing member, and engages in the second circuit board, to fix the securing member to the second circuit board.

4. The mounting apparatus of claim 1, wherein the securing member is mounted between the first and second circuit boards.

* * * * *